(12) United States Patent
Jiang et al.

(10) Patent No.: US 10,268,444 B2
(45) Date of Patent: Apr. 23, 2019

(54) BLUETOOTH IDENTITY BINDING FOR VOLUME CONTROL

(71) Applicant: Microsoft Technology Licensing, LLC, Redmond, WA (US)

(72) Inventors: Naiyi Jiang, Bellevue, WA (US); Ying N. Chin, Bellevue, WA (US); Robert Zhu, Bellevue, WA (US); Satyendra Bahadur, Yarrow Point, WA (US); Qian Zhou, Sammamish, WA (US); Roger W. Porter, Duvall, WA (US); Carlos Picoto, Bellevue, WA (US); Daryl A. Welsh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 15/639,703

(22) Filed: Jun. 30, 2017

(65) Prior Publication Data
US 2018/0150277 A1    May 31, 2018

Related U.S. Application Data

(60) Provisional application No. 62/428,405, filed on Nov. 30, 2016.

(51) Int. Cl.
*G06F 17/00* (2006.01)
*G06F 3/16* (2006.01)
(Continued)

(52) U.S. Cl.
CPC .............. *G06F 3/165* (2013.01); *G06F 11/30* (2013.01); *H04M 1/6066* (2013.01);
(Continued)

(58) Field of Classification Search
CPC .................................................... G06F 3/165
See application file for complete search history.

(56) References Cited

U.S. PATENT DOCUMENTS 8,831,680 B2   9/2014  Fa et al.
9,225,815 B2  12/2015  Zhang et al.
(Continued)

FOREIGN PATENT DOCUMENTS

EP        2991373 A1    3/2016

OTHER PUBLICATIONS

"International Search Report and Written Opinion Issued in PCT Application No. PCT/US2017/063177", dated Feb. 21, 2018, 12 Pages.
(Continued)

*Primary Examiner* — Joseph Saunders, Jr.
(74) *Attorney, Agent, or Firm* — Scott Y. Shigeta; Han Gim; Newport IP, LLC

(57) ABSTRACT

Techniques for controlling audio volume output by a paired device are described. A first notification indicative of a change to a first volume by a first audio output device generated. The first notification comprises a first identifier of the first audio output device. A first record indicative of a volume of audio is stored. The first record is indexed by the first identifier. A second notification indicative of an audio stream being redirected from the first audio output device to a second audio output device is generated. The second notification comprises a second identifier of the second audio output device. A second record indicative of a second volume of audio output by the second device is retrieved. The second record is retrieved based at least in part on the second identifier. The second audio output device outputs audio at the second volume, based at least in part on the second record.

18 Claims, 8 Drawing Sheets

(51) Int. Cl.
    *H04R 27/00*     (2006.01)
    *G06F 11/30*     (2006.01)
    *H04M 1/60*     (2006.01)
    *H04R 3/12*     (2006.01)
    *H04R 5/04*     (2006.01)

(52) U.S. Cl.
    CPC .......... *H04R 27/00* (2013.01); *H04M 1/6016* (2013.01); *H04M 2250/02* (2013.01); *H04R 3/12* (2013.01); *H04R 5/04* (2013.01); *H04R 2420/01* (2013.01); *H04R 2420/07* (2013.01); *H04R 2430/01* (2013.01)

(56) References Cited

U.S. PATENT DOCUMENTS

| | | |
|---|---|---|
| 9,439,082 B2 | 9/2016 | Fischer |
| 9,496,843 B1 | 11/2016 | Chawandi |
| 2007/0173212 A1 | 7/2007 | Mergler |
| 2007/0291955 A1* | 12/2007 | Yamashita ............... H04R 5/00 381/79 |
| 2009/0323987 A1* | 12/2009 | Yang ........................ H03G 1/02 381/109 |
| 2011/0087964 A1 | 4/2011 | Patterson et al. |
| 2012/0263319 A1 | 10/2012 | Chen |
| 2014/0297900 A1 | 10/2014 | Herbert et al. |
| 2015/0156588 A1 | 6/2015 | Kyriakakis et al. |
| 2016/0103653 A1 | 4/2016 | Jang |
| 2016/0234606 A1 | 8/2016 | Selig et al. |

OTHER PUBLICATIONS

Klosowski, Thorin, "Adjust the Volume Based on Output Device in OS X", http://lifehacker.com/adjust-the-volume-based-on-output-device-in-os-x-1707715193, Published on: May 29, 2015, 2 pages.

\* cited by examiner

BLUETOOTH IDENTITY BINDING FOR VOLUME CONTROL

CROSS REFERENCE TO RELATED APPLICATIONS

This application claims benefit under 35 U.S.C. § 119(e) of Provisional U.S. patent application No. 62/428,405, filed Nov. 30, 2016, the contents of which is incorporated herein by reference in its entirety.

TECHNICAL FIELD

This disclosure relates generally to controlling audio volume output by a paired device.

BACKGROUND

A mobile device such as a smartphone typically supports different audio output devices. When a paired device is switched to a new device, it is desirable to save the last volume data for the old device and restore the last saved volume data for the new device. One example of an output device is a BLUETOOTH audio device. BLUETOOTH devices typically share one BLUETOOTH endpoint. Control of audio volume output by paired devices has been a longstanding issue in BLUETOOTH device usage.

SUMMARY

The present disclosure relates to control of audio volume output by paired BLUETOOTH devices. In particular, the disclosure relates to maintaining consistent or predictable volume output levels when switching between audio output devices. Consistency and predictability of the output volume between uses may improve the user experience, particularly in situations where unexpected or inappropriate changes in volume would otherwise occur.

In an example embodiment, a computing device may obtain unique device identifiers for audio output devices to which the computing device is paired. The unique device identifiers may be included in volume change notifications and endpoint change notifications generated by and distributed within components of the computing device. The unique identifiers are provided synchronously with the volume change notifications and the endpoint change notifications. Providing the unique identifier synchronously with the notifications may avoid various race conditions that could lead to disassociation between an audio output device and its volume properties.

In a further aspect of the example embodiment, the computing device may stream audio to a paired audio output device. While the stream is active, the computing device may receive an indication to adjust the volume of the audio output device. The computing device may respond to the indication by transmitting instructions to the audio device to adjust the volume and by generating a notification comprising information about the adjusted volume and a notification of the volume change. The notification may be processed by components of the computing device. The components may, in some instances, be associated with applications or system components that generate the audio stream. In response to the notification, a component may store a record that includes information indicative of the adjusted volume. The record may be stored using a unique identifier of the first audio output device as an index key. In some instances, the stored information may be application-specific or specific to a particular type of audio stream.

In a further aspect of the example embodiment, the computing device may receive an indication that audio is to be redirected to a second audio output device. The computing device may generate a notification that the audio is to be redirected to a different endpoint. The notification may comprise a unique identifier of the second audio output device. A component of the computing device may respond to the notification by retrieving stored volume information using the unique identifier of the second audio output device and adjusting the volume output by the second audio output device based on the stored volume information. The adjusted volume may be based on application-specific factors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

In an embodiment, a structure, such as the BLUETOOTH_ADDRESS or BT_ADDR structure, may be a computer memory-based representation of an address of a BLUETOOTH device. The device address may be represented as a series of bytes. In an embodiment, a device address may be represented as a series of 6 bytes and/or as a collection of 48 bits. A BLUETOOTH address may sometimes be represented as a 12-digit hexadecimal number or alphanumeric string. In some instances, a device address may be represented as a lower address portion, an upper address portion, and a non-significant address portion. These examples are intended to be illustrative, and should not be viewed as limiting the scope of the present disclosure to embodiments which employ the structures just described. Various other address structures may be employed in other embodiments consistent with the present disclosure.

In an embodiment, a device address may represent the network address of a BLUETOOTH-enabled device. The device address may, for example, be used to identify the device in operations such as connecting to the device or pairing with the device. In various embodiments, a BLUETOOTH device address may uniquely identify the device. In various other embodiments, a device address may be unique across a limited universe of devices, such as those devices which may connect to and interface with other devices within a network.

In an embodiment, an address may comprise or be equivalent to a media access control ("MAC") address. The device address may be used as an address for network interfaces and devices in network technologies such as ETHERNET or WIFI.

An endpoint may refer to a terminal point in a communications channel between BLUETOOTH-enabled devices. For example, a tablet computing device might correspond to a first endpoint of an ad hoc, BLUETOOTH-based communications network. A wireless headset may correspond to a second endpoint of the communications network. Messages may be sent between the two endpoints using BLUETOOTH-compatible media and protocols, including but not limited to WIFI or BLUETOOTH radio.

Embodiments may include BLUETOOTH profiles. A BLUETOOTH profile may correspond to a specification or protocol for accessing a service of a BLUETOOTH device. Examples of BLUETOOTH profiles include Advanced Audio Distribution Profile ("A2DP"), Headset Profile ("HSP"), and the Hands-Free Profile ("HFP"). The services performed may relate to aspects of audio playback, including but not limited to connecting to playback devices, initiating and suspending playback, adjusting audio volume level, and so forth.

Figure 1:
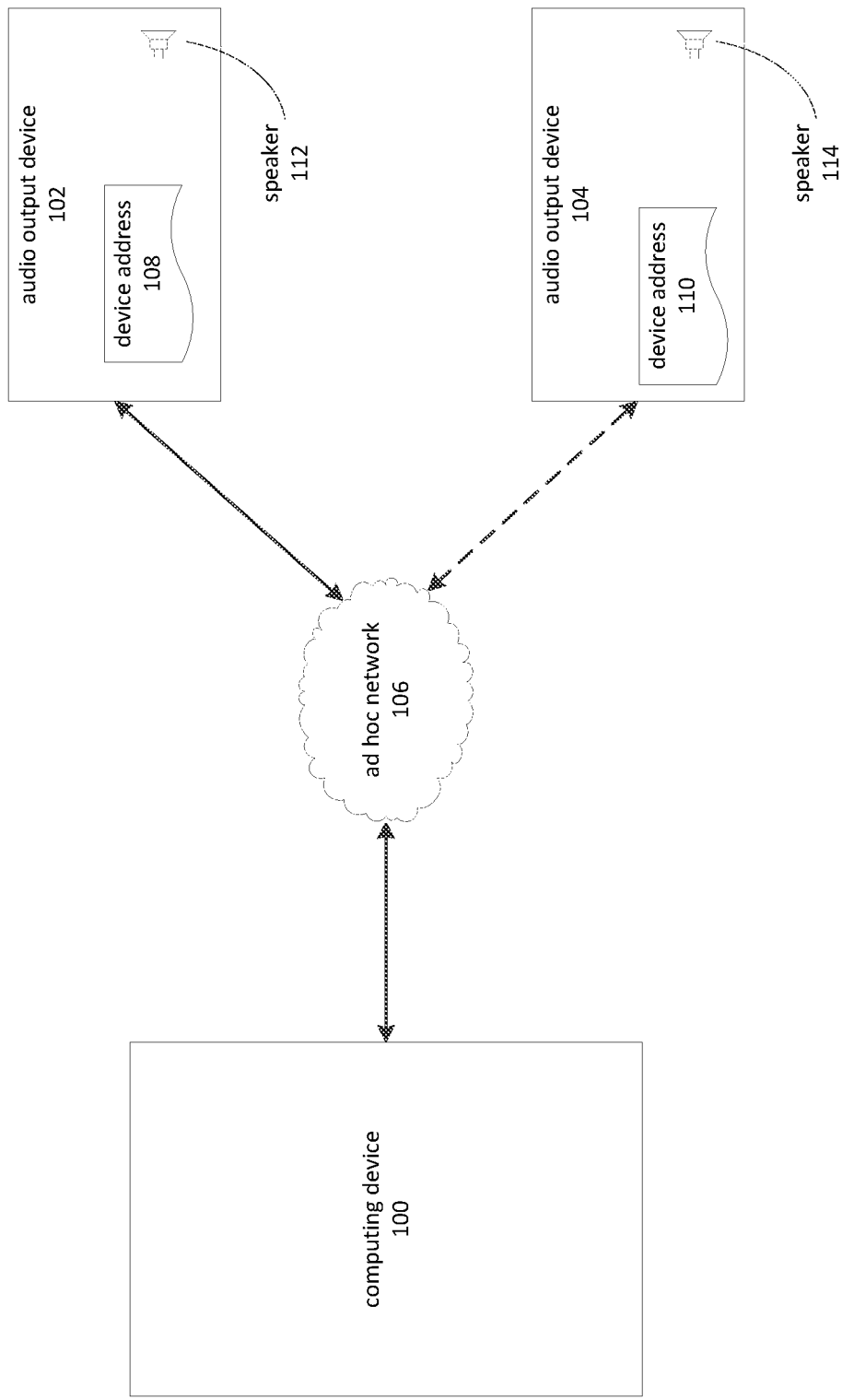
FIG. 1 is a diagram depicting an example embodiment of a computing device comprising audio volume management.

FIG. 1 is a diagram depicting an example embodiment of a computing device comprising audio volume management. Management of audio volume may include, in various embodiments, the maintenance of preferred or continuous audio volume output by BLUETOOTH-enabled audio output devices. A computing device 100 may participate in an ad hoc network 106. A first audio output device 102 and a second audio output device 104 may also participate in the ad hoc network 106. Participation in the ad hoc network 106 may, in some instances, be discontinuous. For example, the second audio output device 104 may join, leave, and re-join the ad hoc network 106 at various times.

The computing device 100 may be a personal computer, tablet computer, smartphone, radio, digital audio source, and so forth. The computing device 100 may comprise one or more processors, a memory, and various input/output devices. The computing device 100 may also comprise networking hardware for participating in the ad hoc network 106, potentially including ETHERNET, WIFI, and BLUETOOTH interfaces.

The audio output devices 102, 104 may be devices that support audio output, e.g. a receiver, wireless headphones, integrated amplifier, wireless speaker, and so forth, and that support BLUETOOTH communication and one or more BLUETOOTH profiles, such as A2DP or HSP. In some instances, an audio stream may be transmitted from the computing device 100 to one or both audio output devices 102, 104. For example, an audio stream may be transmitted from the computing device 100 to the first audio output device 102, and then transmitted instead to the second audio output device 104. This might occur, for example, when a mobile phone (corresponding to the depicted computing device 100) is first connected to a wireless headphone device (e.g., the first audio device 102), and then connected instead to a car stereo system (e.g., the second audio device 104). In various embodiments, the audio output devices 102, 104 may comprise speakers 112, 114.

In an embodiment, an audio output level for the first audio output device 102 may be preserved by the computing device 100 when the audio stream is redirected to the second audio output device 104. The preserved audio output level may be restored when the audio stream is subsequently directed back to the first audio output device 102. Similarly, when the audio stream is directed to the second audio output device 104, a volume level previously employed by the second audio output device 104, I relation to the audio stream, may be used by the second audio output device 104 in playing back the audio stream.

In an embodiment, the audio output levels of the first audio output device 102 and the second audio output device 104 may be made consistent when switching from the first audio output device 102 to the second audio output device 104. Consistency may refer to output decibels of the audio output devices 102, 104. Maintaining consistency may comprise adjusting output volume of the respective audio output devices 102, 104 to compensate for the audio output characteristics of the devices 102, 104. For example, overall output might be made consistent by adjusting for differences in speaker volume, amplifier power, speaker sensitivity, and so forth.

The computing device 100 may respond changes in a desired or available audio output device. For example, the computing device 100 may respond to a request to change the audio output device from the first audio output device 102 to the second audio output device 104. A change in audio output device may be described as an endpoint change.

The computing device 100 may respond to endpoint changes by identifying a unique device address of a device to which an audio stream was directed prior to the endpoint change. The computing device 100 may, for example, identify a device address of the first audio output device 102 in response to determining that the audio stream is to be redirected to the second audio device 104.

In an embodiment, notification messages may be generated by the operation of the computing device 100 in response to connectivity changes in the ad hoc network. For example, in some instances the second audio output device 104 might be paired with the computing device 100 and configured to receive an audio stream, via the ad hoc network 106, from the computing device 100. In other instances, the computing device 100 might move out of range of the first audio output device 102, thus causing the first audio output device 102 to depart from the ad hoc network 106. In other instances, a user of the computing device 100 might indicate that audio output should be generated by the second audio output device 104 instead of the first audio output device 102.

The computing device 100 may obtain and preserve volume information for the first audio output device 102 during its operation. The computing device 100 may receive notification of volume change events for the first audio output device 102. For example, in some instances, the audio volume of the first audio output device 102 might be adjustable via volume controls of the computing device 100. The audio volume may, in some instances, be adjustable via these controls during a period in which audio is streamed from the computing device 100 to the first audio output device 102.

In various embodiments, the volume change notifications may include a device identifier such as a unique device address 108, 110 of a device whose volume is being adjusted. Conventionally, volume change notifications in BLUETOOTH have not included unique device addresses 108, 110.

In various embodiments, the computing device 100 may preserve volume information associated with the first audio output device 102. In an embodiment, the computing device 100 may store a record using the unique device address 108 of the first audio output device 102 as a key. The key may be used by the computing device 100 to uniquely identify, for storage and retrieval, a record in which the volume information for the device is stored.

In an embodiment, the computing device 100 may preserve volume information for a device in response to a volume change notification. For example, when a user presses a volume control on the computing device 100, the computing device may obtain a unique device address 108 for the device to which audio is being streamed, e.g. the first audio output device 102. The computing device 100 may then generate a volume change notification including the unique device address 108. The volume change notification may be processed by sending a message to adjust the volume to the first audio output device 102, and storing a record indicative of the volume to which the first audio output device 102 was set.

In an embodiment, the computing device 100 may respond to a request to redirect an audio stream from the first audio output device 102 to the second audio output device 104. The computing device 100 may respond by obtaining a unique device address 110 of the second audio output device 104 and retrieving stored volume information using the unique device address 110 as a key. The computing device 100 may then cause the output audio volume of the second device to be adjusted based on the retrieved information. While the second audio output device 104 is active, volume changes applied to it may be associated with the corresponding device address 110.

Figure 2:
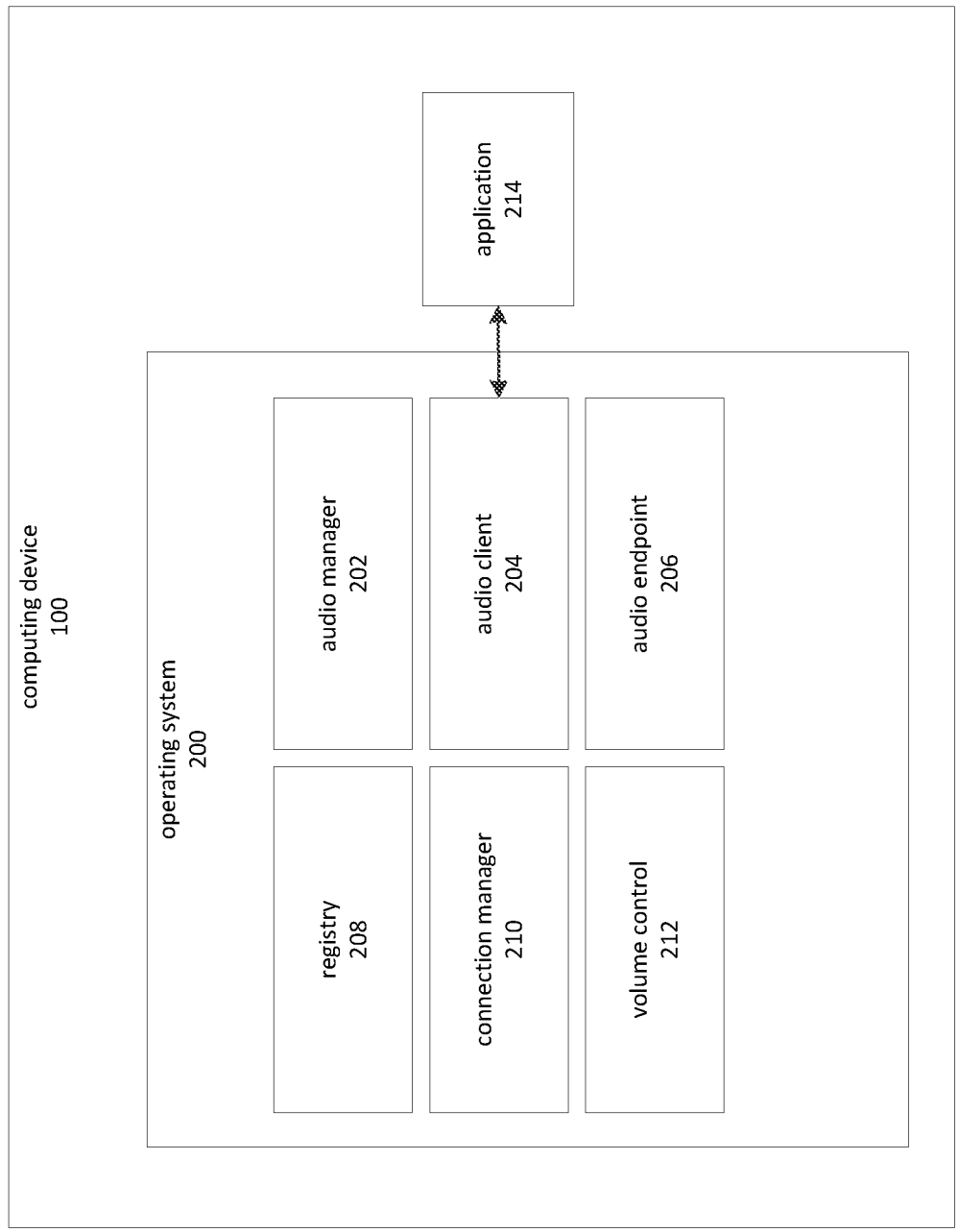
FIG. 2 is a diagram depicting an example of a volume management component of a computing device.

FIG. 2 is a diagram depicting an example of a volume management component of a computing device. In various embodiments, the computing device 100 may comprise an audio management component, one or more audio client components, and one or more audio endpoint components.

An audio manager component 202 may include a portion of memory of a computing device 100. The memory may bear instructions for managing aspects of audio playback by the computing device 100. These aspects may include management of audio volume output by endpoint audio devices. The audio manager component 202 may be referred to, in some instances, as a volume manager.

An audio client component 204 may include a portion of memory of the computing device 100 on which further instructions for managing aspects of audio playback are stored. The instructions may be for aspects of audio playback related to facilitating communication between an application 212 which generates audio and an endpoint audio device which may play the generated audio. The audio client component 104 may sometimes be referred to as a volume manager client.

An audio endpoint component 206 may include a portion of memory of the computing device 100, on which further instructions for managing aspects of audio playback are stored. The instructions may be for aspects of audio playback related to a communications channel between the computing device 100 and an audio output device 102, 104.

A registry component 208 may include a portion of memory of the computing device 100 on which instructions for storing and retrieving information are stored. The registry component 208 may further comprise a persistent data store, such as a dedicated portion of a disk drive or solid-state memory.

A user may initiate a volume change on the computing device 100. The volume change may, for example, be initiated by pressing a "volume up" or "volume down" button. In other instances, the volume change may be initiated via a software-based, virtual control. These and other components for adjusting volume may be referred to as a volume control 212.

The volume control 212 may signal the audio client 204 to provide notification of the requested volume change to other components, such as the audio endpoint 206. The audio client 204 may, in some embodiments, determine which endpoint devices and audio stream(s) are affected by the volume change.

In an embodiment, multiple audio streams are supported. Examples of audio streams include, but are not limited to, an application audio stream, a system audio stream, and a communications audio stream. The application audio stream may pertain to audio generated by a specific application, or by a plurality of applications. The system audio stream may pertain to audio generated by the operating system. Examples include sounds generated in response to mouse clicks, windowing events, system-level errors, system notifications, and so forth. The communications audio stream may include output levels used in conjunction with phone calls, microphone output, and so forth. The audio client 204 may determine which stream(s) are affected based on various rules, configuration settings, or other factors. These may include system settings regarding combination and isolation of audio streams.

In an embodiment, the audio client 204 may determine which endpoint devices(s) are affected by the volume change. In an embodiment, the audio client 204 may determine which endpoint device(s) are affected based on an endpoint device being currently connected and receiving an audio stream. In an embodiment, the audio client 204 may determine which endpoint device(s) are affected based on the endpoint device also presently playing back the audio stream.

In an embodiment, the audio client 204 may obtain a unique device address for each affected endpoint device. For example, with reference to FIG. 1 the audio client 204 may obtain the device address 108 for the first audio output device 102 when the volume output by the first audio output device 102 is being adjusted. The audio client 204 may include the device address 108 in the volume change notification message.

In an embodiment, the audio manager 202 may receive a volume change notification and respond to it by storing volume data in the registry 208. The audio manager 202 may, in an embodiment, store volume data for each permutation of affected device and affected stream.

In an embodiment, the audio manager 202 may initiate volume recalculations in response to the volume change notifications. This may comprise obtaining a volume policy information, attenuation information, and volume change indications provided by the volume change notification. In an embodiment, volume recalculation may comprise combining policy volume with client volume information. The audio client 204 may, for example, have volume levels associated with the application 214. These volume levels may be adjusted based on system volume policies, such as those pertaining to maximum output, relative output with respect to other streams, and so forth.

In an embodiment, the audio manager 202 may monitor endpoint change notification messages. In some instances, an endpoint change may occur when a device is joins the ad hoc network 106. In other instances, an endpoint change may occur when a device leaves the ad hoc network. 106. In an embodiment, a device may join the ad hoc network 106 when in pairs, via BLUETOOTH, to another device on the network, such as the computing device 100. Similarly, the device may leave the ad hoc network 106 when it unpairs from the other device.

In an embodiment, the audio manager 202 may store volume levels for a prior audio output device when it receives an endpoint change indication. The audio manager 202 may, in an embodiment, store the information in the registry 208. The information may be stored in a registry key corresponding to or identified by a device address.

In an embodiment, the audio manager 202 may retrieve volume information from the registry 208. The audio manager 202 may, in an embodiment, retrieve volume information corresponding to the new endpoint based on a device address associated with the new endpoint. In some cases no applicable information may be available. This may occur, for example, when the new endpoint corresponds to a device that is new or that had not been used previously for audio reproduction. When no applicable information is available, a predetermined volume level for new devices may be used. Alternatively, a volume level may be calculated based on various rules. For example, a volume level associated with the previous device might be used with the new endpoint. In an embodiment, the previous device volume level might be attenuated. The attenuation might, in some instances, reflect characteristics of the new device—for example default volume levels for headphone devices might be attenuated more than default volume levels for a car stereo.

In an embodiment, the audio manager 202 may communicate with a connection manager 210 to obtain a device address for a device associated with the new endpoint. In an embodiment, the audio manager 202 may register with the connection manager 210 to receive events indicative of endpoint changes. The connection manager 210 may send notifications of such events, when they occur, to the audio manager 202.

In an embodiment, the audio client 204 may communicate with the connection manager 210 to obtain a device address for a device associated with a new endpoint. The audio client 204 may register to receive endpoint change notifications from the connection manager 210. When an endpoint change notification occurs, the connection manager 210 may send notifications of the endpoint change to other components, such as the audio client 204, that have registered to receive the endpoint change notifications.

Figure 3:
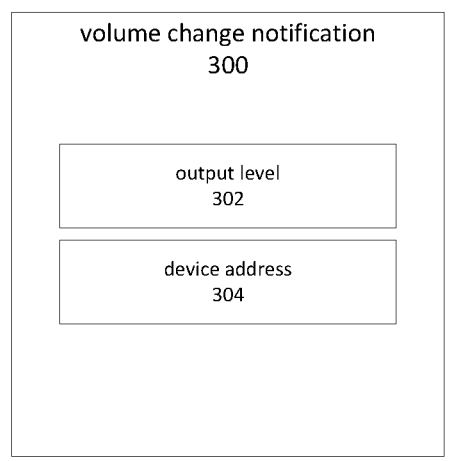
FIG. 3 is a diagram depicting an example of a volume change notification message.

In various embodiments, notification messages related to volume setting and volume adjustment may be extended to include device identifiers. FIG. 3 is a diagram depicting an example of a volume change notification message.

A volume change notification 300 may, in various embodiments, be transmitted between components of a computing system 100. The volume change notification 300 that is depicted by FIG. 3 is one of many possible embodiments of a notification related to volume adjustments. In various embodiments, fields in addition to or instead of those depicted in FIG. 3 may be included in a volume-related notification. However, each of these embodiments may include a device address 304 or other data permitting identification of the device to which a volume change is applicable. Inclusion of the device address 304, or other data, enables various embodiments of the present disclosure.

For example, inclusion of the device address 304 may permit an audio manager 202 to store volume information using the device address 304 as a key. Consequently, the audio manager 202 is able to maintain associations between specific devices and their associated volume levels.

Figure 4:
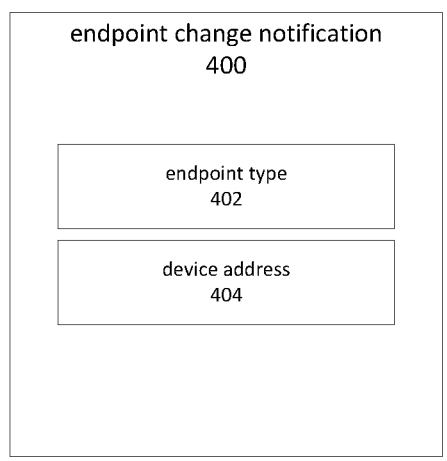
FIG. 4 is a diagram depicting an example of an endpoint change notification message.

In various embodiments, notification messages related to endpoint changes may be extended to include device identifiers. FIG. 4 is a diagram depicting an example of an endpoint change notification message. The endpoint change notification 400 depicted by FIG. 4 is one example of many possible embodiments, which may include fields in addition to or instead of those depicted in FIG. 4. However, the inclusion of the device address 404 in the endpoint change notification may enable avoidance of race conditions. In some instances and embodiments, if the device address 404 is not included in the endpoint change notification 404, a race condition may cause volume adjustments to be incorrectly assigned or lost, with respect to a prior device or a new device.

Figure 5:
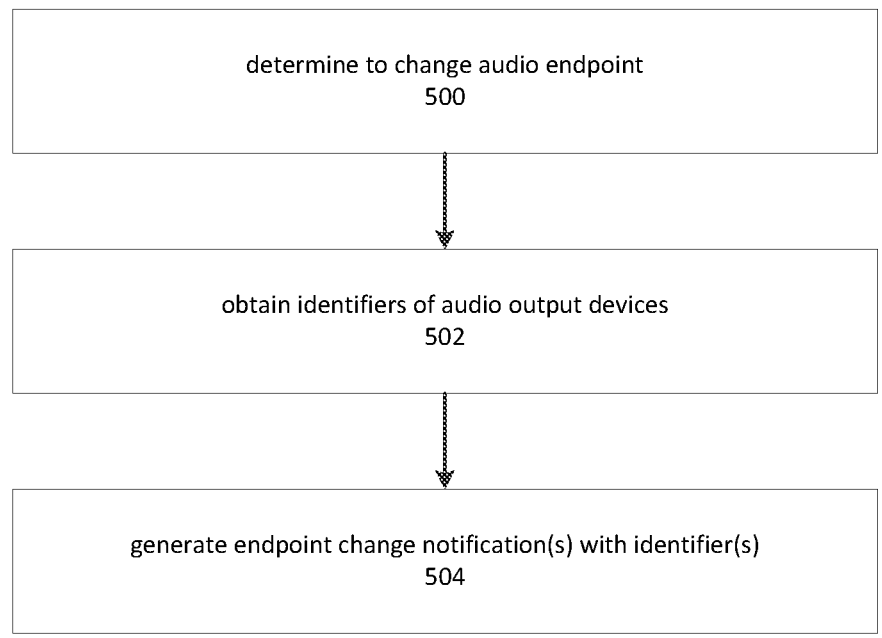
FIG. 5 is a diagram depicting an example of generating endpoint change notification.

FIG. 5 is a diagram depicting an example of generating endpoint change notification. Although depicted as a sequence of blocks, it will be appreciated that various embodiments may depart from the depicted sequence. Moreover, in various embodiments aspects of the depicted sequence may be altered, reordered or omitted.

Block 500 depicts a computing device 100 determining to change an audio endpoint. The determination may be based on one or more of various factors, including but not limited to device pairing, device unpairing, user selection, user input, and so forth.

Block 502 depicts the computing device 100 obtaining identifiers of audio output devices. A unique device identifier for an audio output device may be obtained during the pairing process and stored by the computing device 100 for later use. In particular, the saved device identifiers may be included in subsequent volume change and endpoint change notifications.

Block 504, for example, depicts generating endpoint change notification(s) that include the saved device identifier. By including the device identifier in the endpoint change notifications distributed within components of the computing device 100, the components may be enabled to track associations between volume output levels, or other audio characteristics, and the device with which an endpoint is associated.

Figure 6:
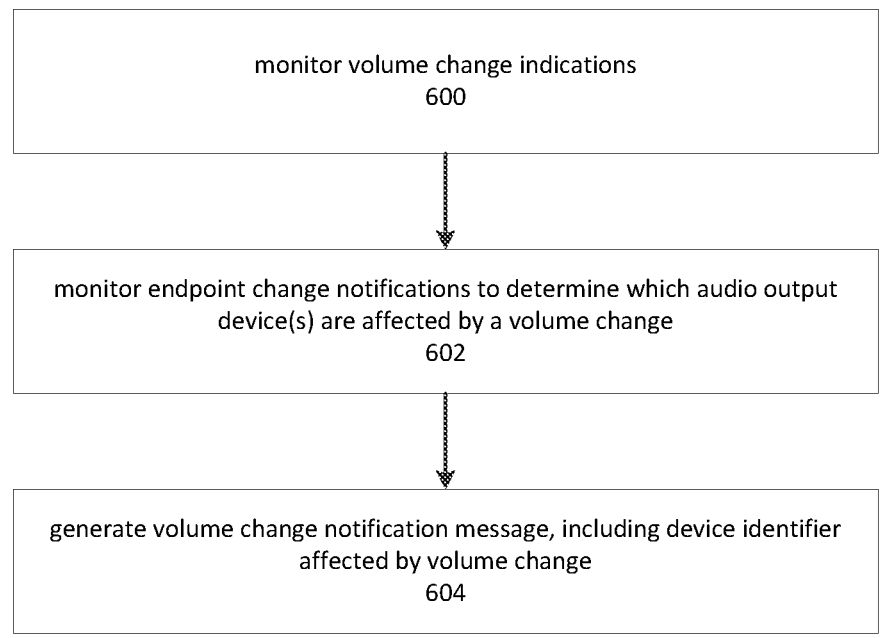
FIG. 6 is a diagram depicting an example of processing volume changes.

FIG. 6 is a diagram depicting an example of processing volume changes. Although depicted as a sequence of blocks, it will be appreciated that various embodiments may depart from the depicted sequence. Moreover, in various embodiments aspects of the depicted sequence may be altered, reordered or omitted.

Block 600 depicts monitoring volume change indications. The computing device 100 may respond to the indication by generating a volume change notification that includes a unique device identifier for a device affected by the volume change. In an embodiment, monitoring volume change indications may comprise determining that a user of the computing device 100 has initiated a volume change using the volume control 212. In an embodiment, monitoring volume change indications may comprise determining that the output volume of an audio output device has been change via direct user interaction with the audio device.

Block 602 depicts monitoring endpoint change notifications to determine which audio output device(s) are affected by a volume change. The endpoint change notifications may include the device identifier(s) of whatever device(s) are connected and outputting audio. When an indication of a volume change is received (as depicted by block 600), the computing device 100 may infer that the volume change is associated with these device(s).

Block 604 depicts generating a volume change notification message. In an embodiment, the volume change notification message may include device identifier(s) for those device(s) affected by the volume change. In an embodiment, the device identifier is available at the same time, i.e. synchronously, with the remainder of the notification that a desired output volume of the device has changed.

Figure 7:
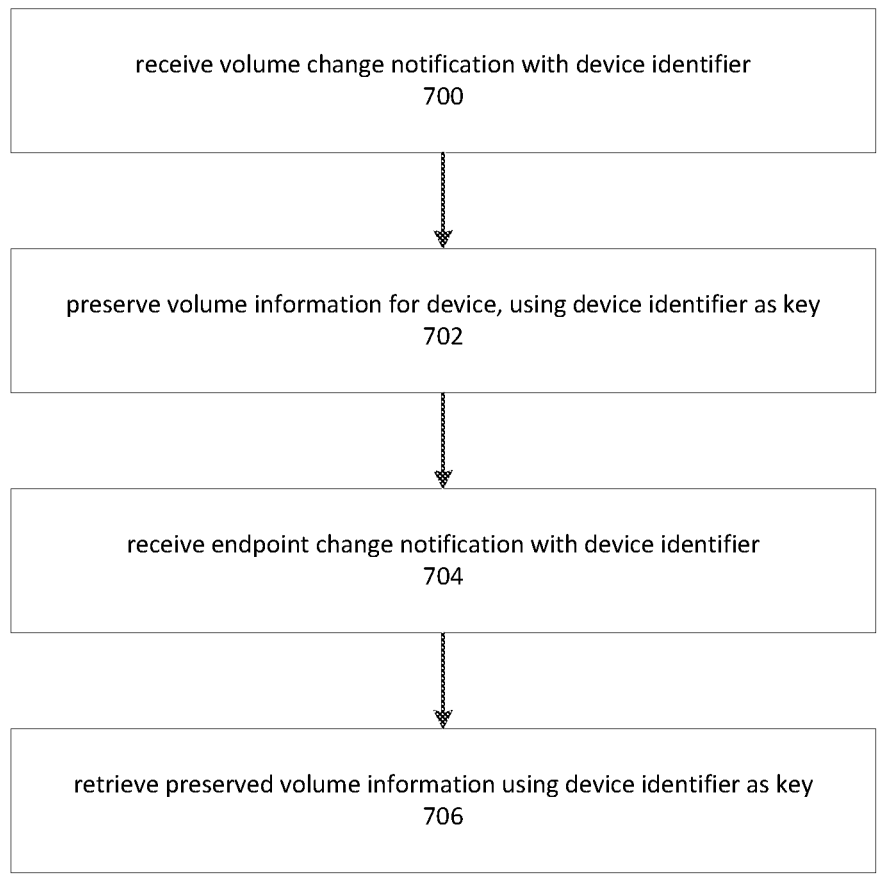
FIG. 7 is a diagram depicting an example of preserving volume continuity during endpoint changes.

FIG. 7 is a diagram depicting an example of preserving volume continuity during endpoint changes. Although depicted as a sequence of blocks, it will be appreciated that various embodiments may depart from the depicted sequence. Moreover, in various embodiments aspects of the depicted sequence may be altered, reordered or omitted.

Block 700 depicts a component of the computing device 100 receiving a volume change indication that includes a device identifier for an audio output device affected by the volume change. In some instances, volume information may be preserved in response to receiving the volume change notification.

Block 702 depicts the component preserving volume information for the device. In an embodiment, the component uses the unique device identifier of an affected device as a "key" for storing the information. For example, the device identifier may be used as a registry key in a system registry.

Block 704 depicts the component receiving an endpoint change notification that includes a device identifier. In response to the notification, the component may, as depicted by block 706, retrieve preserved volume information using the device identifier as a key.

In an embodiment, a system may be implemented that comprisesg a processor and memory. The memory may store computer-executable instructions that, when executed by the processor, cause the system to perform operations comprising:

store a plurality of volume notifications, each volume notification comprising an identifier of a Bluetooth audio output device and data indicative of an output level associated with the Bluetooth audio output device;

receive an endpoint change notification that is generated in response to an audio stream being redirected from a first Bluetooth audio output device to a second Bluetooth audio output device, the endpoint change notification comprising an identifier of the second Bluetooth audio output device;

in response to receiving the endpoint change notification, retrieve a volume notification associated with the second Bluetooth audio output device, the retrieved volume notification identified based at least in part on the identifier contained in the endpoint change notification; and cause the second Bluetooth audio output device to output audio at an output level identified in the retrieved volume notification for the second Bluetooth audio output device.

In an embodiment, the identifiers are registry keys in a system registry.

In an embodiment, the audio stream is redirected based at least in part on one or more of device pairing, device unpairing, user selection, and user input.

In an embodiment, the identifiers are unique device identifiers for Bluetooth audio output devices obtained during a pairing process.

In an embodiment, the volume notifications are generated based at least in part on determining that an output volume of a Bluetooth audio output device has been changed via user interaction with the audio device.

In an embodiment, the system further comprises computer-executable instructions that, when executed by the processor, cause the system to perform operations comprising monitoring endpoint change notifications and determining which Bluetooth audio output devices are affected by a volume change.

In an embodiment, the system further comprises computer-executable instructions that, when executed by the processor, cause the system to perform operations comprising maintaining consistency between volumes between Bluetooth audio output devices.

In an embodiment, maintaining consistency comprises adjusting output volume of the Bluetooth audio output devices to compensate for audio output characteristics of the Bluetooth audio output devices.

In an embodiment, a computing device may be implemented. The computing device comprises:

a processor;
a memory storing:
a first record comprising:
a first identifier of a first audio output device to which an audio stream is directed; and
first information indicative of a first output volume for the first audio output device;
a second record comprising:
a second identifier of a second audio output device to which an audio stream is directed; and
second information indicative of a second output volume for the second audio output device;
wherein:
the first and second records are indexed by the first and second identifiers; and
the first audio output device and second audio output device are communicatively coupled to the computing device using Bluetooth;
the memory storing computer-executable instructions that, when executed by the processor, cause the computing device to perform operations comprising:
in response to a notification indicative of a redirection of the audio stream, the notification including an identifier of a destination audio output device for the audio stream; and
set a volume level of the destination audio output device, the volume level based at least in part on the first or second record as indexed by the identifier of the destination audio output device.

In an embodiment, the first identifier and second identifier are registry keys in a system registry.

In an embodiment, the audio stream is redirected based at least in part on one or more of device pairing, device unpairing, user selection, and user input.

In an embodiment, the first identifier and second identifier are unique device identifiers for an audio output device obtained during a pairing process.

In an embodiment, the first record is generated based at least in part on determining that an output volume of the first audio output device has been changed via user interaction with the audio device.

In an embodiment, the computing device further comprises computer-executable instructions that, when executed by the processor, cause the computing device to perform operations comprising monitoring endpoint change notifications and determining which audio output devices are affected by a volume change.

In an embodiment, the computing device further comprises computer-executable instructions that, when executed by the processor, cause the computing device to perform operations comprising maintaining consistency between volumes of the first and second audio output devices.

In an embodiment, maintaining consistency comprises adjusting output volume of the audio output devices to compensate for audio output characteristics of the audio output devices.

In an embodiment, a method may be implemented that comprises:

in response to receiving an endpoint change notification, accessing a volume notification associated with a Bluetooth endpoint, the volume notification identified based at least in part on an endpoint identifier contained in the endpoint change notification, wherein the endpoint change notification is generated in response to redirection of an audio stream to the Bluetooth endpoint; and sending, to the Bluetooth endpoint, data indicative of an output level, wherein the output level is identified in the accessed volume notification, the output level usable to control an output audio at the Bluetooth endpoint, wherein the output level is indicative of a previous output level of the Bluetooth endpoint when the Bluetooth endpoint was last receiving an audio stream.

In an embodiment, the endpoint identifier is a registry key in a system registry.

In an embodiment, the endpoint identifier is a unique device identifier for an audio output device and obtained during a pairing process.

In an embodiment, the volume notification is generated based at least in part on determining that an output volume of the Bluetooth endpoint has been changed via user interaction with an audio device associated with the Bluetooth endpoint.

Figure 8:
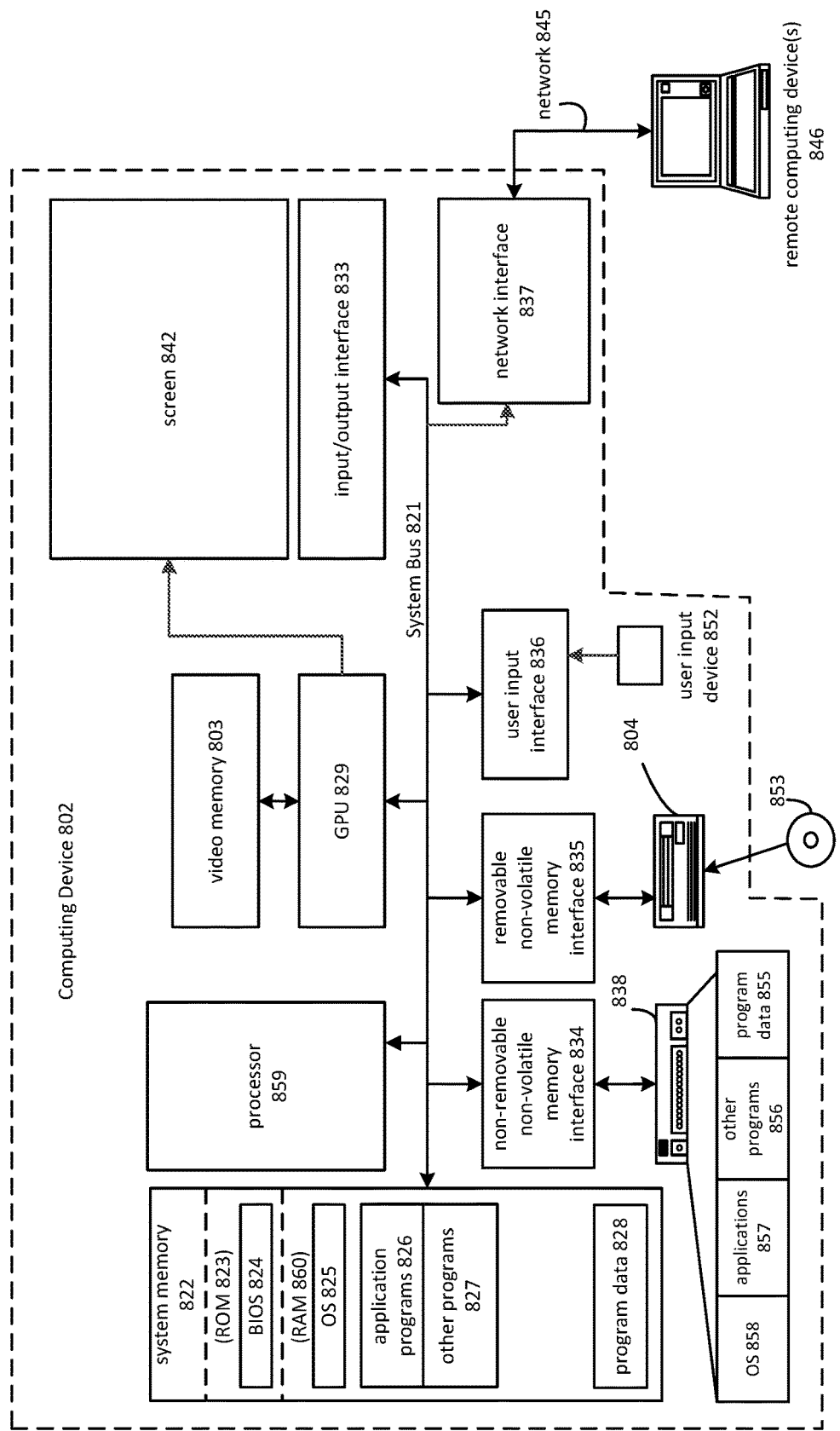
FIG. 8 depicts an example general purpose computing environment in which in which the techniques described herein may be embodied.

Aspects of the present disclosure may be implemented on one or more computing devices or environments. FIG. 8 depicts an example computing environment in which in which some of the techniques described herein may be embodied. The computing device 802 is only one example of a suitable computing environment and is not intended to suggest any limitation as to the scope of use or functionality of the presently disclosed subject matter. Neither should the depiction of the computing environment be interpreted as implying any dependency or requirement relating to any one or combination of components illustrated in the example computing device 802. In some embodiments the various depicted computing elements may include circuitry configured to instantiate specific aspects of the present disclosure. For example, the term circuitry used in the disclosure can include specialized hardware components configured to perform function(s) by firmware or switches. In other example embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing device 802, which may include any of a mobile device, smart phone, tablet, laptop, desktop computer, etc., typically includes a variety of computer-readable media. Computer-readable media can be any available media that can be accessed by computing device 802 and may include both volatile and nonvolatile media, removable and non-removable media. Media and computer readable media are physical mediums and as such do not include propagating signals per se or transitory signals per se.

The system memory 822 includes computer-readable storage media in the form of memory such as read only memory ("ROM") 823 and random access memory ("RAM") 860. The RAM memory 860 may include volatile memory modules, such as dual in-line memory modules ("DIMMs"). The RAM 860 portion of system memory 822 may sometimes be referred to as main memory. RAM 860 typically contains data and/or program modules that are immediately accessible to and/or presently being operated on by processor 859. By way of example, and not limitation, FIG. 8 illustrates operating system 825, application programs 826, other program modules 827, and program data 828.

The processor 859 typically contains at least one primary processing unit, sometimes referred to as a core, and at least one system agent, sometimes referred to as an uncore. The core of the processor 859 typically executes computer-executable instructions while the uncore performs related tasks which may include overseeing memory transfers and maintaining a processor cache. The uncore may comprise a memory controller for interfacing between cores of the processor 859 and system memory 822.

A basic input/output system 824 ("BIOS"), containing the basic routines that help to transfer information between elements within computing device 802, such as during start-up, is typically stored in ROM 823. The BIOS 824 may be replaced, in various embodiments, by other firmware.

The computing device 802 may also include non-volatile storage devices. By way of example only, FIG. 8 illustrates a hard disk drive 838 that reads from or writes to non-removable, non-volatile magnetic media, and an optical disk drive 814 that reads from or writes to a removable, non-volatile optical disk 853 such as a CD ROM or other optical media. Other non-volatile storage devices that can be used in the example operating environment include, but are not limited to, flash memory, digital versatile disks, solid state disk drives, and the like. The hard disk drive 838 is typically connected to the system bus 821 through an non-removable memory interface such as interface 834, and optical disk drive 804 is typically connected to the system bus 821 by a removable memory interface, such as interface 835.

The drives and their associated computer storage media discussed above and illustrated in FIG. 8, provide storage of computer-readable instructions, data structures, program modules and other data for the computing device 802. In FIG. 8, for example, hard disk drive 838 is illustrated as storing instructions of the operating system 858, application programs 857, other program modules 856, and program data 855. Note that these components can either be the same as or different from operating system 825, application programs 826, other program modules 827, and program data 828. Operating system 858, application programs 857, other program modules 856, and program data 855 are given different numbers here to illustrate that, at a minimum, they are different copies. A user may enter commands and information into the computing device 802 through a user input device 852. The user interface device 852 may include, but is not limited to, keyboards, touchpads, computer mice, trackballs, and so forth. Other input devices, also not shown, may include a microphone, joystick, game pad, satellite dish, scanner, or the like. These and other input devices are often connected to the processing unit 859 through a user input interface 836 that is coupled to the system bus, but may be connected by other interface and bus structures, such as a parallel port, game port or a universal serial bus (USB). A screen 842 or other type of display device is also connected via GPU 829, although in some instances the screen 842 may be driven through the system bus 821 or another interface. In addition to the monitor, computers may also include other peripheral input/output devices such as speakers, printers, and so forth which may be connected through an input/output interface 833.

The computing device 802 may operate in a networked environment using logical connections to one or more remote computers, such as a remote computer 846. The remote computer 846 may be a personal computer, a server, a router, a network PC, a peer device or other compute node, and typically includes many or all of the elements described above relative to the computing device 802. The connections depicted in FIG. 8 include a network 845, which may include local-area, wide-area, cellular, and mesh networks, or other types of networks.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Each of the processes, methods and algorithms described herein may be embodied in, and fully or partially automated by, modules comprising computer executable instructions loaded into memory and executed by one or more processors of a computing device. The processes and algorithms may also be implemented wholly or partially in application-specific circuitry. The results of the disclosed processes and process steps may be stored, persistently or otherwise, in any type of computer storage device such as, e.g., volatile or non-volatile storage. Volatile and non-volatile storage, as used herein, excludes propagating or transitory signals per se.

The various features and processes described herein may be used independently of one another, or may be combined in various ways. All possible combinations and subcombinations are intended to fall within the scope of this disclosure. In addition, certain elements of the processes, methods, and algorithms may be omitted in some implementations. The methods and processes described herein are also not limited to any particular sequence, and the depictions comprising blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

The embodiments presented herein are so presented by way of example, and are not intended to limit the scope of the present disclosure. Thus, nothing in the foregoing description is intended to imply that any particular feature, characteristic, step, module or block is required, necessary, or indispensable. The methods and systems described herein may be embodied in a variety of forms. Various omissions, substitutions and changes in the form of the methods and systems described herein may be made without departing from the spirit of what is disclosed herein. The accompanying claims and their equivalents are intended to cover such forms or modifications as would fall within the scope and spirit of certain embodiments disclosed herein.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims

What is claimed is:

1. A system comprising a processor and memory, the memory storing computer-executable instructions that, when executed by the processor, cause the system to perform operations comprising:
store a plurality of volume notifications, each volume notification comprising an identifier of a Bluetooth audio output device and data indicative of an output level associated with the Bluetooth audio output device;
receive an endpoint change notification that is generated in response to an audio stream being redirected from a first Bluetooth audio output device to a second Bluetooth audio output device, the endpoint change notification comprising an identifier of the second Bluetooth audio output device;
in response to receiving the endpoint change notification, retrieve a volume notification associated with the second Bluetooth audio output device, the retrieved volume notification identified based at least in part on the identifier contained in the endpoint change notification;
cause the second Bluetooth audio output device to output audio at an output level identified in the retrieved volume notification for the second Bluetooth audio output device; and
determining that audio output characteristics of the first and second Bluetooth audio output devices are different and maintaining volume consistency by adjusting an output volume of the second Bluetooth audio output device to compensate for audio output characteristics of the second Bluetooth audio output device, and otherwise maintaining volume consistency between the first and second Bluetooth audio output devices by tracking output levels for the first and second Bluetooth audio output devices based on the identifiers of the first and second Bluetooth audio output devices.

2. The system of claim 1, wherein the identifiers are registry keys in a system registry.

3. The system of claim 1, wherein the audio stream is redirected based at least in part on one or more of device pairing, device unpairing, user selection, and user input.

4. The system of claim 1, wherein the identifiers are unique device identifiers for Bluetooth audio output devices obtained during a pairing process.

5. The system of claim 1, wherein the volume notifications are generated based at least in part on determining that an output volume of a Bluetooth audio output device has been changed via user interaction with the audio device.

6. The system of claim 1, further comprising computer-executable instructions that, when executed by the processor, cause the system to perform operations comprising monitoring endpoint change notifications and determining which Bluetooth audio output devices are affected by a volume change.

7. A computing device, comprising:
a processor;
a memory storing:
a first record comprising:
a first identifier of a first audio output device to which an audio stream is directed; and
first information indicative of a first output volume for the first audio output device;
a second record comprising:
a second identifier of a second audio output device to which an audio stream is directed; and
second information indicative of a second output volume for the second audio output device;
wherein:
the first and second records are indexed by the first and second identifiers; and
the first audio output device and second audio output device are communicatively coupled to the computing device using Bluetooth;
the memory storing computer-executable instructions that, when executed by the processor, cause the computing device to perform operations comprising:
in response to a notification indicative of a redirection of the audio stream, the notification including an identifier of a destination audio output device for the audio stream;
set a volume level of the destination audio output device, the volume level based at least in part on the first or second record as indexed by the identifier of the destination audio output device; wherein the destination audio output device is identified independently of its associated volume level; and
maintaining volume consistency by adjusting an output volume of the destination audio output device to compensate for audio output characteristics of the destination audio output device.

8. The computing device of claim 7, wherein the first identifier and second identifier are registry keys in a system registry.

9. The computing device of claim 7, wherein the audio stream is redirected based at least in part on one or more of device pairing, device unpairing, user selection, and user input.

10. The computing device of claim 7, wherein the first identifier and second identifier are unique device identifiers for an audio output device obtained during a pairing process.

11. The computing device of claim 7, wherein the first record is generated based at least in part on determining that an output volume of the first audio output device has been changed via user interaction with the audio device.

12. The computing device of claim 7, further comprising computer-executable instructions that, when executed by the processor, cause the computing device to perform operations comprising monitoring endpoint change notifications and determining which audio output devices are affected by a volume change.

13. The computing device of claim 7, further comprising computer-executable instructions that, when executed by the processor, cause the computing device to perform operations comprising maintaining consistency between volumes of the first and second audio output devices.

14. The computing device of claim 13, wherein maintaining consistency comprises adjusting output volume of the audio output devices to compensate for audio output characteristics of the audio output devices.

15. A method comprising:
in response to receiving an endpoint change notification, accessing a volume notification associated with a Bluetooth endpoint, the volume notification identified based at least in part on an endpoint identifier contained in the endpoint change notification, wherein the endpoint change notification is generated in response to redirection of an audio stream to the Bluetooth endpoint; and
sending, to the Bluetooth endpoint, data indicative of an output level, wherein the output level is identified in the accessed volume notification, the output level usable to control an output audio at the Bluetooth endpoint,
wherein the output level is indicative of a previous output level of the Bluetooth endpoint when the Bluetooth endpoint was last receiving an audio stream and the output level is usable to maintain volume consistency between uses of the Bluetooth endpoint by tracking previous output levels associated with the endpoint identifier; and maintaining volume consistency by adjusting an output volume of the Bluetooth endpoint to compensate for audio output characteristics of the Bluetooth endpoint.

16. The method of claim 15, wherein the endpoint identifier is a registry key in a system registry.

17. The method of claim 15, wherein the endpoint identifier is a unique device identifier for an audio output device and obtained during a pairing process.

18. The method of claim 15, wherein the volume notification is generated based at least in part on determining that an output volume of the Bluetooth endpoint has been changed via user interaction with an audio device associated with the Bluetooth endpoint.

\* \* \* \* \*